United States Patent [19]

House

[11] 3,967,246

[45] June 29, 1976

[54] DIGITAL COMPUTER ARRANGEMENT FOR COMMUNICATING DATA VIA DATA BUSES

[75] Inventor: Frederick Glenn House, Downers Grove, Ill.

[73] Assignee: Bell Telephone Laboratories, Incorporated, Murray Hill, N.J.

[22] Filed: June 5, 1974

[21] Appl. No.: 476,436

[52] U.S. Cl. .............................................. 340/172.5
[51] Int. Cl.² ............................................ G06F 9/18
[58] Field of Search ...................... 340/172.5; 445/1

[56] References Cited
UNITED STATES PATENTS

| | | |
|---|---|---|
| 3,395,394 | 7/1968 | Cottrell, Jr. ..................... 340/172.5 |
| 3,399,384 | 8/1968 | Crockett et al. ................. 340/172.5 |
| 3,478,321 | 11/1969 | Cooper et al. ................... 340/172.5 |
| 3,488,633 | 1/1970 | King et al. ...................... 340/172.5 |
| 3,543,242 | 11/1970 | Adams, Jr. et al. .............. 340/172.5 |
| 3,553,656 | 1/1971 | Bernhardt ....................... 340/172.5 |
| 3,599,162 | 8/1971 | Byrns et al. ..................... 340/172.5 |
| 3,665,404 | 5/1972 | Werner ........................... 340/172.5 |
| 3,665,415 | 5/1972 | Beard et al. ..................... 340/172.5 |
| 3,676,861 | 7/1972 | Ruth ............................... 340/172.5 |

*Primary Examiner*—Gareth D. Shaw
*Assistant Examiner*—John P. Vandenburg
*Attorney, Agent, or Firm*—J. C. Albrecht; F. W. Padden

[57] ABSTRACT

A digital computer arrangement is disclosed including a central processing unit, a plurality of peripheral units coupled to a peripheral bus, a memory access controller, a first memory bus, and a second memory bus. The first memory bus serves a first plurality of memory units and the second memory bus serves a second plurality of memory units. The memory access controller selects which of the peripheral units may use the peripheral bus to access a memory bus during a particular time interval. If use of a particular memory bus is requested by a peripheral unit for an interval in which that memory bus is required by the central processing unit, the memory access controller preempts the usage of that memory bus by the peripheral unit for the interval. In addition, when a peripheral unit which has been permitted to use the peripheral bus is preempted from actually communicating with a memory in a particular interval, the memory access controller operates in combination with the peripheral units to maintain the priority of the preempted peripheral unit for requesting use of the peripheral bus during the next possible interval.

3 Claims, 7 Drawing Figures

MEMORY ACCESS CONTROLLER BLOCK DIAGRAM

DIGITAL COMPUTER ARRANGEMENT FOR COMMUNICATING DATA VIA DATA BUSES

BACKGROUND OF THE INVENTION

1. Field of the Invention

This invention relates to the field of data processors and more specifically to data processors employing a plurality of peripheral units connected by means of data buses and private lines to a selection controller.

2. Description of the Prior Art

Data processor technology has advanced in recent years to the point that in some instances the inherent propagation delay in the transfer of information from two physical points consumes a substantial portion of the time available for data processing. It has, therefore, become necessary to minimize such propagation delays or, at least, to minimize the ill effects of such delays. The method most used in the past to minimize delay has been to minimize the physical separation of communicating components of a digital system. However, the minimization of the physical separation of communicating components is constrained by many factors and, at some point in such minimization, a practical limit is reached. At that point, actual propagation delay can be minimized no further and methods must be sought to minimize the ill effects of the residual propagation delay.

The problem of propagation delay is especially significant in systems employing a plurality of peripheral units connected by a peripheral bus to a means of peripheral unit selection. The communication efficiency of the entire peripheral unit community may be limited by the physical propagation delays. In such a system, it is necessary to select the peripheral unit to use the peripheral bus for a particular interval of time in the most efficient manner for minimizing the effect of the propagation delay. More specifically, the interchange of request and control signals required for the selection of a particular one of the many peripheral units to use the peripheral unit bus must either be minimized or advantageously interleaved with data transfer. This is particularly true in a system in which it is possible that a peripheral unit, once having been selected to use the peripheral bus, may be preempted from its communication function by, for example, a conflict with the needs of the central processor.

Several systems have been developed which effectively minimize the deleterious effects of propagation delays on the efficiency of a peripheral unit community by advantageous use of control signals. However, such prior systems have not minimized these deleterious effects when the possibility of peripheral unit preemption is considered. More specifically, such systems have not been capable of minimizing the deleterious effects of propagation delays on a peripheral bus in the situation where a peripheral unit selected to use the peripheral bus actually uses it to transfer data and also in the situation where a peripheral unit selected to use the peripheral bus is not permitted to complete its data transfer operation.

SUMMARY OF THE INVENTION

A data processor arrangement in accordance with this invention minimizes the effects of propagation delay on a peripheral bus by employing a succession of bus request signals for each peripheral unit requesting use of that bus. More specifically, each peripheral unit generates a succession of bus request signals whenever it requires access to a memory. A controller provided to control the selection of peripheral units to use the bus responds to the received request signals and transmits particular signals to the selected peripheral unit only if actual data communication by the selected peripheral unit is permitted. In response to such signals, the selected peripheral unit terminates its transmission of request signals.

Specifically, peripheral units desiring access to the data processor memories generate repetitive access request signals to bid for use of the memories. Priority circuitry in a memory access controller receives the request signals and selects one peripheral unit on the basis of a predetermined priority. The selected peripheral unit is then enabled by circuitry in the memory access controller to generate an address designating the memory which the enabled peripheral unit desires to access. The memory access controller circuitry then receives and decodes the address generated by the enabled peripheral unit and a first comparator in the access controller compares the decoded address received from the enabled peripheral unit with an address received from a central processor to determine if the memory selection by the peripheral unit conflicts with the memory selection by the processor.

It is a feature of the present invention that the priority circuitry in the memory access controller comprises two priority circuits. Each priority circuit is responsive to a set of access requests from the peripheral units for identifying the highest priority requests in the set. The outputs of the two priority circuits are compared by a second comparator to determine if the same unit is identified by each priority circuit. If the same unit is identified by both priority circuits, further circuitry in the controller enables the unit identified by one priority circuit to generate an address code. Storage circuitry is operated by the second comparator to store the identity of the enabled unit. Finally, logic circuitry cooperating with the storage circuitry blocks subsequent requests by the enabled peripheral unit from reaching the second priority circuit. The use of two priority circuits allows the memory access controller to decide if a newly arriving set of requests contains a request from a peripheral unit which has higher priority than the unit which the controller circuitry is currently processing for service. The existence of a higher priority request is indicated by a match at the comparator, and if such a match exists, the higher priority circuit is then enabled to generate an address code for processing while processing is stopped on the unit currently being handled.

It is a further feature of the present invention that control circuitry cooperates with the first and second comparators to control access request generation in the peripheral units so that if the memory access controller receives no requests from peripheral units with higher priority than the peripheral unit currently being processed, and if no conflict exists between access requests by the enabled peripheral unit and the central processor, the control circuitry disables access request generation from the peripheral unit identified by the storage circuitry to permit completion of information transfer between the identified peripheral unit and the memory designated thereby.

It is still a further feature of the present invention that circuitry is provided in the memory access controller to clear the storage circuitry to permit processing of a new peripheral unit if a higher priority request is received or the unit identified by the storage circuitry is allowed to complete information transfer.

Figure 1:
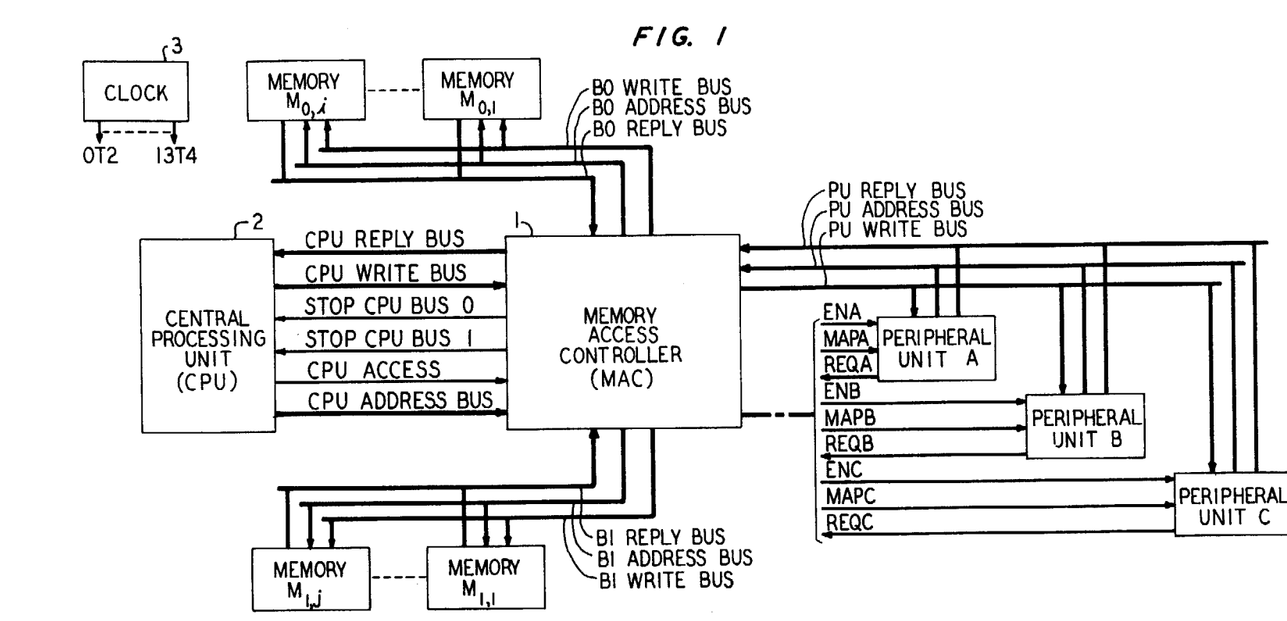
FIG. 1 shows a general block diagram of a digital computer arrangement employing my invention.

FIG. 1 depicts a block diagram representation of a system employing my invention to communicate between a plurality of peripheral units and a plurality of memories or a plurality of memory buses. More specifically, it can be seen that the peripheral units A, B, and C are connected by the peripheral unit (PU) bus, comprising the PU reply bus, the PU address bus, and the PU write bus, to the memory access controller (MAC) 1. These buses are used for communication of data and addresses between the peripheral units and the MAC 1. It can also be seen in FIG. 1 that each of the peripheral units has three individual control lines connecting it with the MAC 1. The significance of these control lines will be described shortly.

The MAC 1 also is connected to a plurality of other buses. A first of these is the memory bus B0, comprising the B0 write bus, the B0 address bus, and the B0 reply bus, which is used to communicate data and addresses to and from the memories $M_{0,I}$ through $M_{0,i}$. A second of these buses is the memory bus B1, comprising the B1 write bus, the B1 address bus, and the B1 reply bus, which is used to communicate data and addresses to and from the memories $M_{1,I}$ through $M_{1,j}$. Thus, the memories $M_{0,I}$ through $M_{0,i}$ and the memories $M_{1,I}$ through $M_{1,j}$ are connected to the MAC 1 by separate and distinct buses.

The MAC 1 is also connected to the central processing unit (CPU) 2 by means of a plurality of control lines and data buses. Specifically, the CPU 2 is connected to the MAC 1 by the CPU bus, comprising the CPU reply bus, the CPU address bus, and the CPU write bus. In addition, control lines are provided for signals CPU ACCESS, STOP CPU BUS 0 and STOP CPU BUS 1. As in the case of the control signals provided to the peripheral units from the MAC 1, the significance of the control signals communicated between the CPU 2 and the MAC 1 will be described below.

Also shown in FIG. 1 is a clock 3 which provides a plurality of output signals (FIG. 4) for control of operations within the CPU 2 (FIG. 1), the MAC 1, and the peripheral units A, B, and C. Thus, it is to be understood that all three of these units, as well as the memory units M comprising the units $M_{0,I}$ through $M_{0,i}$ and $M_{1,I}$ through $M_{1,j}$ are in synchronous operation based upon clock signals provided by the clock 3. However, as will be described in more detail below, in this particular illustrative embodiment, the memory units M operate on a memory cycle which is equal to two CPU or MAC cycles. This invention is not limited to such a memory, however.

For purposes of illustration, three peripheral units, namely peripheral units A, B, and C, have been shown. It should be understood, however, that there is no limit to the number of peripheral units or, for that matter, the number of memories which may be accommodated in different embodiments of my invention. Moreover, also for purposes of illustration, it is assumed that the peripheral unit A is physically closer to the MAC 1 on the respective PU buses than is the peripheral unit B, and, similarly, peripheral unit B is closer to the MAC 1 on the PU buses than is the peripheral unit C. This, too, is not critical to the invention but is assumed merely for illustrative reasons. Finally, it may be assumed that the peripheral unit A is assigned a peripheral bus priority greater than that of the peripheral units B and C and the peripheral unit B is assigned a priority greater than that of the peripheral unit C. The assigned priorities are used to determine, in the case of a conflict between peripheral units, which of the two or more conflicting peripheral units is to be awarded use of the PU bus.

Generally when the peripheral unit A requires access to one of the memories served either by the B0 or the B1 buses, it transmits a request signal, REQA = 1, to the MAC 1. If substantially simultaneously the peripheral unit B also elects to access one of the memories M, it also sends a request signal, namely the signal REQB = 1, to the MAC 1. Only one of the two peripheral units may be permitted to use the PU bus for accessing any of the memories at any one time. Therefore, the conflict between the two peripheral units must be resolved. As mentioned above, such a conflict is resolved by selecting the higher priority peripheral unit, namely, the peripheral unit A, as the preferred peripheral unit to use the peripheral unit bus. As a result, the MAC 1 transmits a signal ENA = 1 to the peripheral unit A. In response to that signal, the peripheral unit A uses the PU address bus to transmit to the MAC 1 the address of the memory location it wishes to access. It should be noted that included in the address is a code defining which of the memory buses B0 or B1 serves the memory containing the location to be accessed. The address is stored in the MAC 1. Moreover, if the operation to be performed is a write operation, that is, an operation in which specific data are to be stored in the memory, the data to be stored are applied to the PU reply bus following the receipt of the enable signal. Thereafter, absent a conflicting need for the same memory bus by the CPU 2, the appropriate memory is accessed using the memory bus specified by the aforementioned code. If a conflict does arise, however, additional signals are employed to effect the ultimate transfer of data for the peripheral unit. A thorough explanation of this situation requires reference to FIGS. 2 and 3, however.

Figure 2:
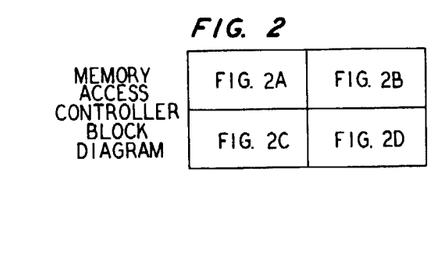
FIG. 2A to 2D, when arranged as indicated by FIG. 2, shows a detailed schematic diagram of the memory access controller shown in FIG. 1.
Figure 2A:
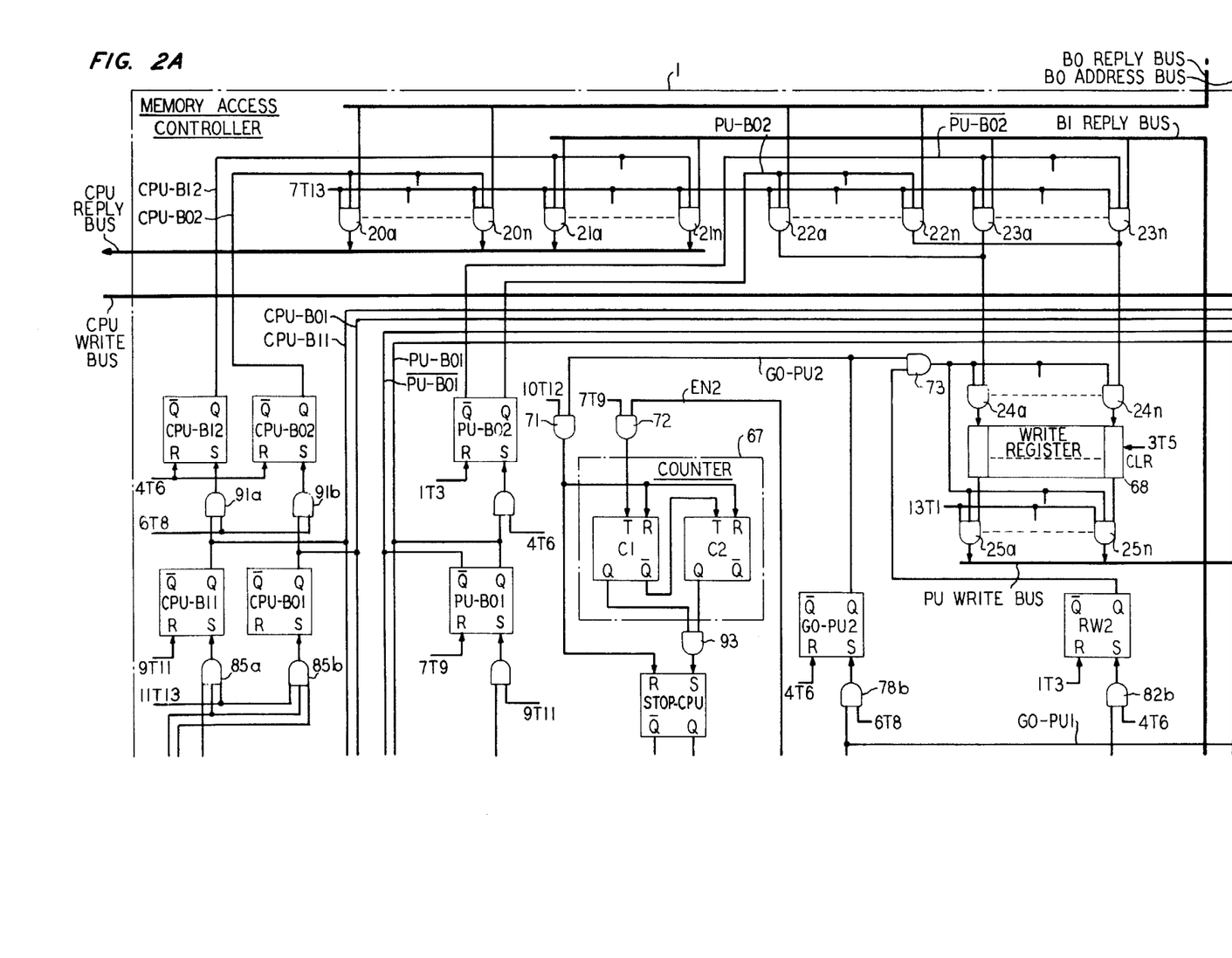
Figure 2B:
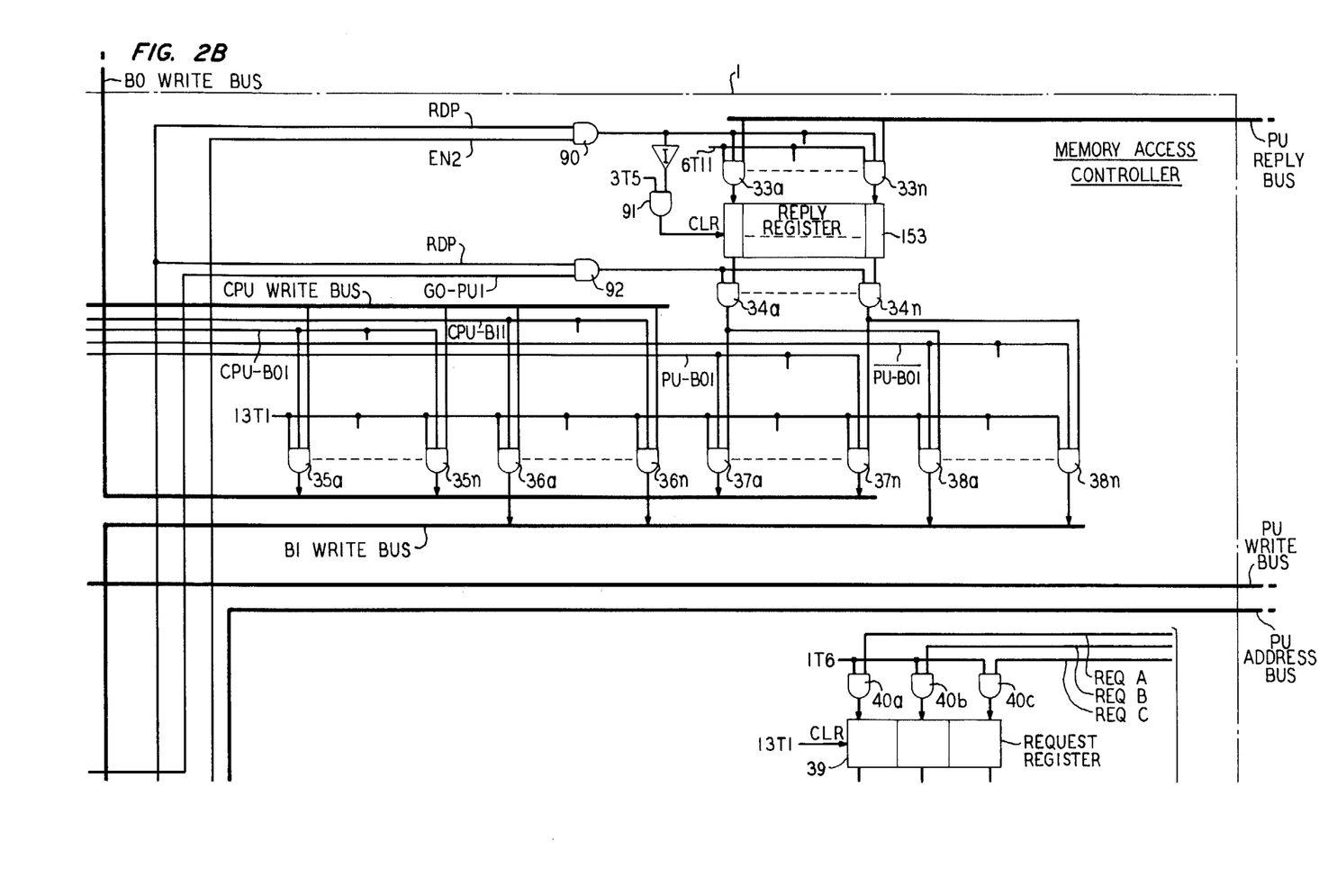
Figure 2C:
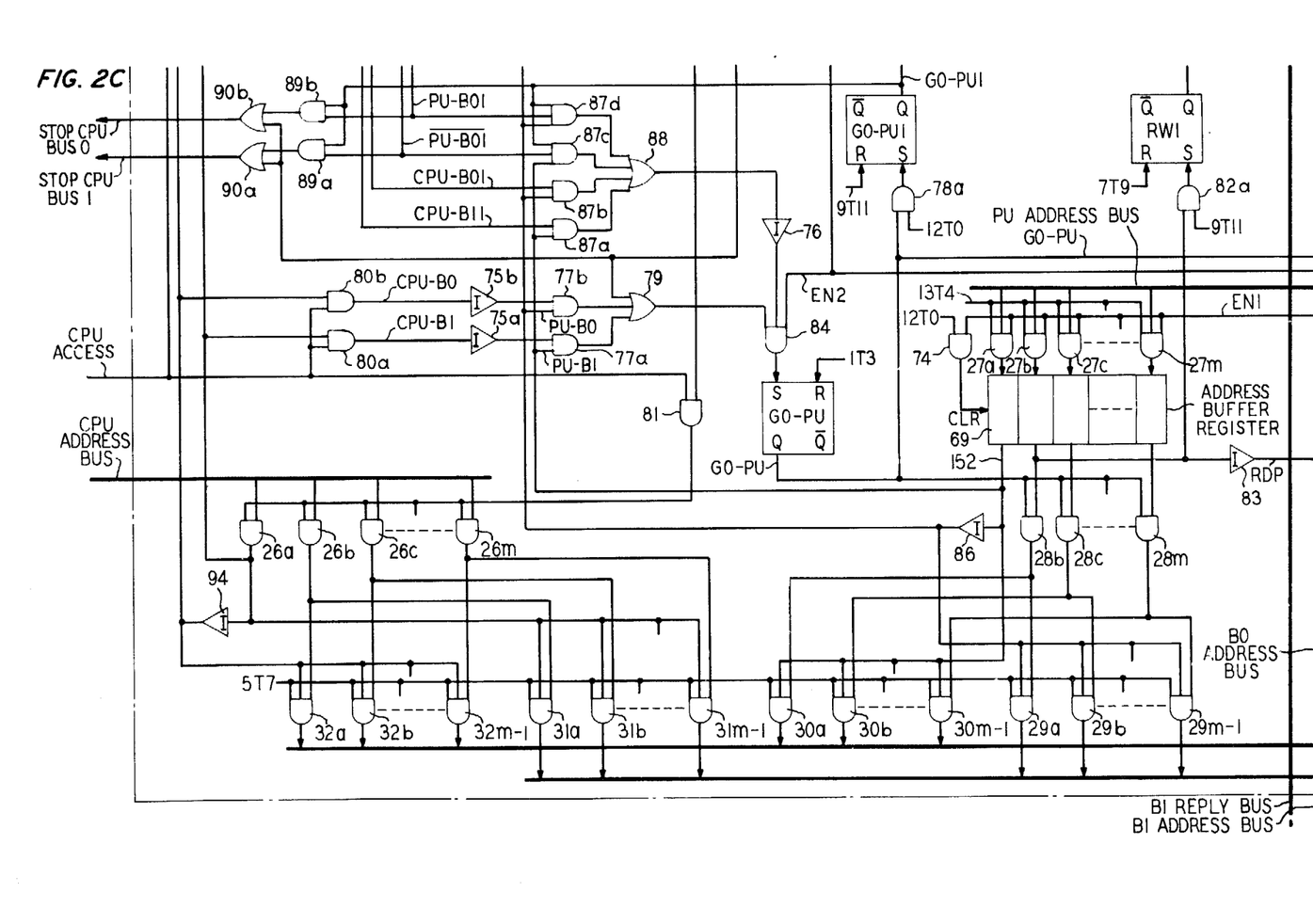
Figure 2D:
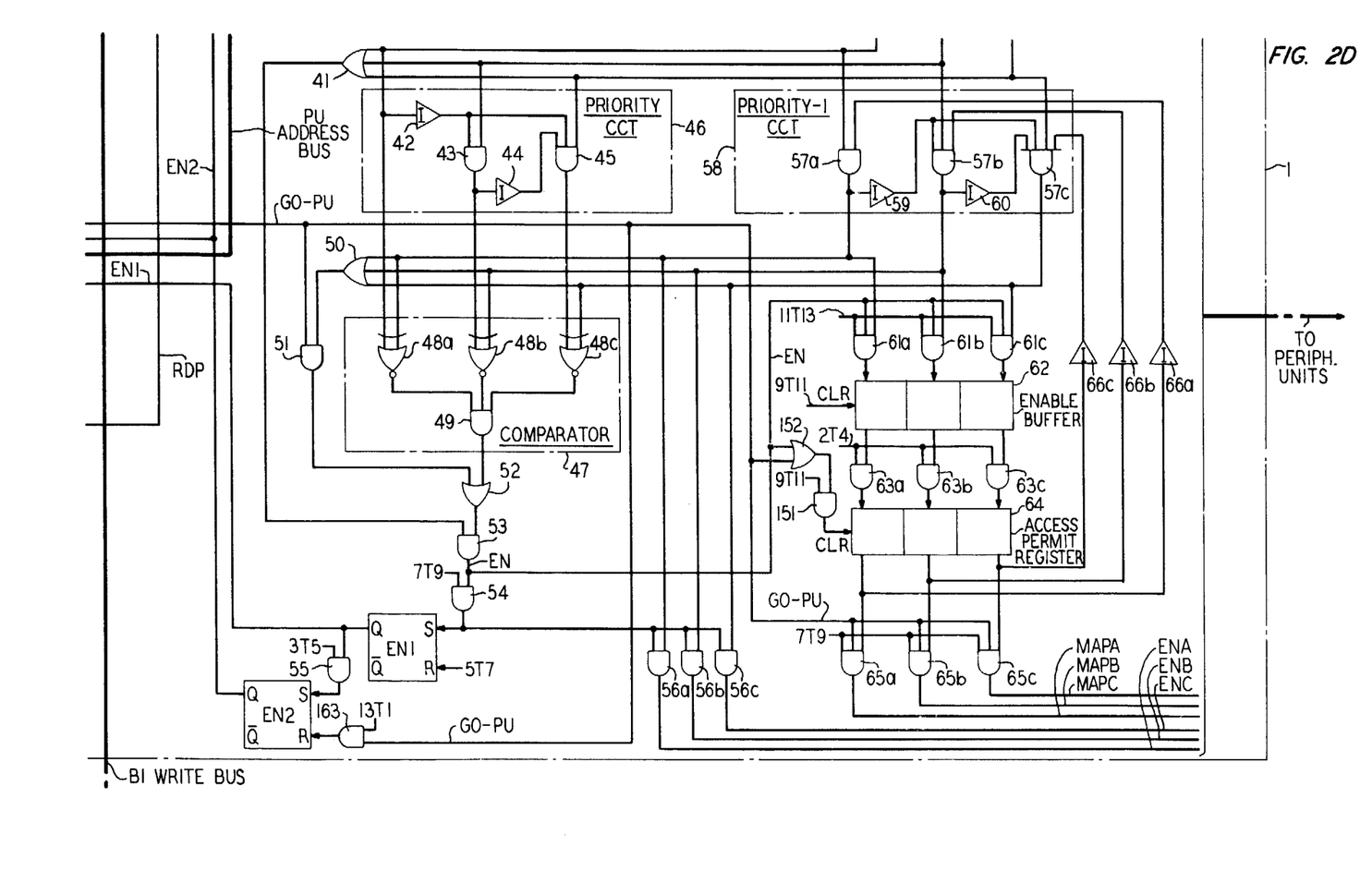
Figure 3:
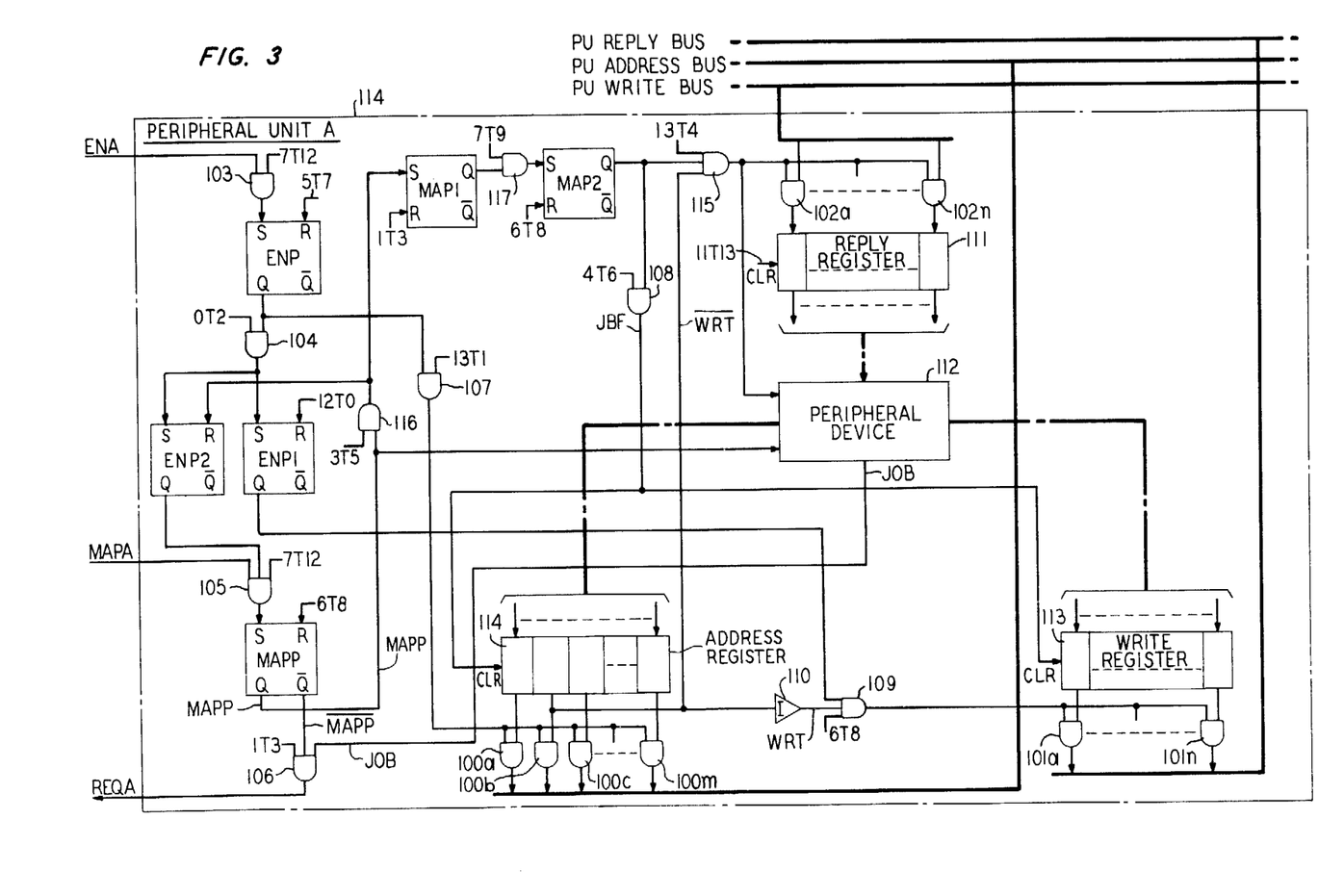
FIG. 3 shows a detailed schematic diagram of the peripheral unit A shown in FIG. 1.

A detailed schematic drawing of the MAC 1 (FIG. 1) is shown in FIG. 2 including FIG. 2A through FIG. 2D. In addition, a detailed schematic drawing of the peripheral unit A is shown in FIG. 3. The peripheral unit A shown in FIG. 3 is exemplary of the peripheral units B and C. It should be noted, however, that the peripheral device 112 (FIG. 3) may differ for the different peripheral units. The peripheral device 112 is not important to this invention and may be any data source, such as a disk or a drum, which requires communication from time to time with a memory unit M (FIG. 1). Certain particular characteristics of these devices required for this illustrative embodiment of the peripheral units will be discussed below.

Peripheral Unit

Before discussing in detail the MAC (FIG. 2), a brief discussion of the typical peripheral unit A (FIG. 3) will be presented. It is assumed that the peripheral device 112 generates the signal JOB = 1 to indicate that it requires access to a memory M (FIG. 1). If a memory M is to be accessed for the purpose of writing data from the peripheral device 112 (FIG. 3) into the memory M (FIG. 1), the peripheral device simultaneously loads the data into the write register 113 (FIG. 3). In addition, irrespective of whether the memory access is required for reading or writing, the address of the memory M (FIG. 1) to be accessed is simultaneously loaded into the address register 114 (FIG. 3).

Figure 4:
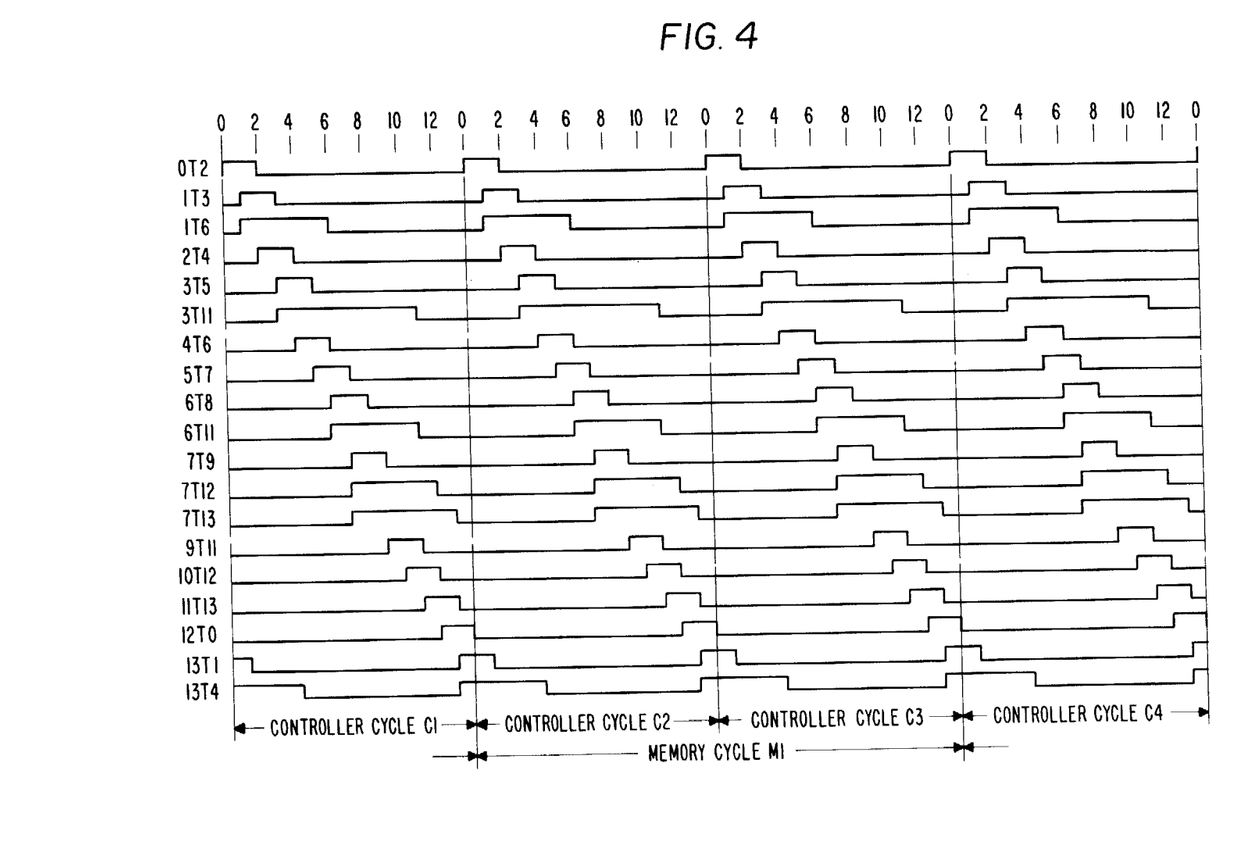
FIG. 4 shows a representation of timing signals generated by the clock shown in FIG. 1.

Assuming further that the flip-flop MAPP (FIG. 3), which will be discussed in more detail below, is reset, the signal MAPP, appearing at the Q output of the MAPP flip-flop, is equal to 1. Both the signals JOB = 1 and MAPP = 1 are applied to the AND gate 106. The final signal applied to the AND gate 106 is the timing signal 1T3. This timing signal is generated by the clock 3 (FIG. 1) and is shown in FIG. 4. When the timing signal 1T3 = 1 (FIG. 3) occurs, a 1 signal appears at the output of the AND gate 106. This 1 signal at the output of the AND gate 106 is the previously mentioned signal REQA. Thus, as a result of the generation by the peripheral device 112 of the signal JOB = 1 simultaneously with the flip-flop MAPP being reset and the occurrence of the timing signal 1T3 = 1, the signal REQA = 1 (FIG. 1) is generated and sent to the MAC 1. It is important to note that as long as the signal JOB (FIG. 3) remains equal to 1 and the flip-flop MAPP remains reset, the signal REQA = 1 (FIG. 1) is generated with each occurrence of the signal 1T3 = 1 (FIG. 4).

Since it was assumed that the peripheral unit A (FIG. 3) is the highest priority peripheral unit, it will receive the signal ENA = 1 (FIG. 1) from the MAC 1 after the generation of the signal REQA = 1. It should be noted, however, that even if the peripheral unit A (FIG. 3) were not the assumed highest priority unit, it could still receive the signal ENA = 1 (FIG. 1) if it happened to be the highest priority peripheral unit requesting memory access at the particular request time. This will be explained in greater detail, however, in connection with the detailed discussion of the MAC (FIG. 2).

The signal ENA = 1 (FIG. 3) is applied to the input of the AND gate 103. The timing signal 7T12 (FIG. 4) is applied to the other input of the AND gate 103 (FIG. 3). As a result, if during the interval in which the timing signal 7T12 (FIG. 4) is equal to 1, the signal ENA = 1 (FIG. 3) is applied to the AND gate 103, the AND gate 103 generates a 1 signal at its output which is applied to the S input of the flip-flop ENP. As a further result, the flip-flop ENP becomes set and generates the signal ENP = 1 at its Q output which signal is applied to an input of the AND gate 107 and to an input of the AND gate 104. The other input of the AND gate 107 is driven by the timing signal 13T1 (FIG. 4). Thus, when the timing signal 13T1 becomes equal to 1, the AND gate 107 (FIG. 3) applies a 1 signal to the AND gates 100. This 1 signal enables the AND gates 100 to apply the contents of the previously mentioned address register 114 to the PU address bus for transmission to the MAC 1 (FIG. 1).

It will be recalled that the signal ENP = 1 from the flip-flop ENP is applied to an input of the AND gate 104. The other input of the AND gate 104 is driven by the timing signal OT2 (FIG. 4). As a result, when the timing signal OT2 becomes equal to 1, the AND gate 104 (FIG. 3) applies a 1 signal to the S input to the flip-flops ENP1 and ENP2. The flip-flops ENP1 and ENP2, therefore, become set. The resulting 1 signal, ENP1 = 1, at the Q output of flip-flop ENP1 is applied to an input of the AND gate 109 and the 1 signal, ENP2 = 1, at the Q output of the flip-flop ENP2 is applied to an input of the AND gate 105. It should be noted that the flip-flop ENP is reset by the subsequent occurrence of the timing signal 5T7 = 1 (FIG. 4).

As mentioned above, the signal ENP1 = 1 is applied to the AND gate 109. One of the other inputs of the AND gate 109 is driven by the signal WRT. When the signal WRT is equal to 1 a write operation is indicated. More specifically, the signal at the output of the address register 114 which drives the AND gate 100b specifies whether the operation to be performed in accessing the selected memory M (FIG. 1) is a read operation or a write operation. If that output of the address register 114 (FIG. 3) is a 0 signal, a write operation is indicated. This signal is applied to the inverter 110 producing the signal WRT = 1. Thus, if the access operation is a write operation, the signal WRT = 1 is applied to the AND gate 109. As a result, when the timing signal 6T8 (FIG. 4), which is applied to the final input of the AND gate 109 (FIG. 3), becomes equal to 1, a 1 signal is generated at the output of the AND gate 109 which is applied to the AND gates 101. As a result, the previously mentioned data stored in the write register 113 in conjunction with the write operation are gated by the AND gates 101 to the PU reply bus for application to the MAC 1 (FIG. 1). It should be noted that the flip-flop ENP1 (FIG. 3) is reset with the next occurrence of the signal 12TO = 1 (FIG. 4).

It will be recalled that the signal ENP2 = 1 at the Q output of the flip-flop ENP2 is applied to the AND gate 105. However, as will be seen below, until such time as a MAPA = 1 signal is received by the peripheral unit A from the MAC 1 (FIG. 1), the flip-flop MAPP (FIG. 3) remains reset. In addition, the signal JOB remains equal to 1 until the device 112 receives an indication that its required accessing operation has been completed. Therefore, with the occurrence of the timing signal 1T3 = 1 (FIG. 4), the aforementioned signal REQA = 1 is generated once again. Thus, two pulses of the signal REQA have been produced coincident with the consecutive occurrences of the timing signal 1T3 = 1 (FIG. 4). The significance of this will become apparent below.

As mentioned above, one of the inputs of the AND gate 105 (FIG. 3) is driven by the signal ENP2 = 1. The other inputs of the AND gate 105 are driven by the signal MAPA and the timing signal 7T12 (FIG. 4), respectively. Therefore, if during the time in which the Q output of the flip-flop ENP2 (FIG. 3) is equal to 1 and the timing signal 7T12 (FIG. 4) is equal to 1, the signal MAPA = 1 is received from the MAC 1 (FIG. 1), a 1 signal is generated at the output of the AND gate 105 (FIG. 3) which is applied to the S input of the flip-flop MAPP. As a result, the flip-flop MAPP becomes set, generating the signals MAPP = 1 and $\overline{\text{MAPP}}$ = 0. The signal $\overline{\text{MAPP}}$ = 0 inhibits the AND gate 106 from generating the signal REQA = 1 at the next occurrence of the signal 1T3 = 1 (FIG. 4).

The MAPP = 1 signal (FIG. 3) is applied to the AND gate 116 and the peripheral device 112. The significance of the signal MAPP = 1 lies in the fact that it indicates that the MAC 1 (FIG. 1) has permitted the access of the desired memory M by the peripheral unit A. Therefore, in the case of a write operation by the peripheral device 112 (FIG. 3), the data previously sent on the PU reply bus to the MAC 1 (FIG. 1) will be applied by the MAC 1 to the memory M specified by the address previously supplied on the PU address bus. In the case of a read operation the signal MAPP = 1 (FIG. 3) for the peripheral unit A indicates that the memory M (FIG. 1) specified by the previously supplied address from the address register 114 (FIG. 3) will subsequently reply with data on the PU write bus to the AND gates 102. To enable the AND gates 102 at the appropriate time when data should be received by them, the MAPP = 1 signal is delayed for two controller cycles by the flip-flops MAP1 and MAP2 before it is applied to the AND gate 115. The other inputs of that AND gate are the signals $\overline{WRT}$ and 13T4 (FIG. 4). Consequently, if the signal $\overline{WRT}$ is equal to 1, indicating that the previously mentioned signal from the address register 114 (FIG. 3) specifies a read operation, simultaneously with the occurrence of the timing signal 13T4 = 1 (FIG. 4) and the signal MAP 2 = 1 (FIG. 3), the AND gates 102 are enabled to gate the data appearing on the PU write bus into the reply register 111. Subsequently, with the occurrence of the timing signal 4T6 = 1 (FIG. 4) which is applied to the AND gate 108 (FIG. 3) along with the signal MAP 2 = 1, signal JBF = 1 is generated and applied as a clear signal to the address register 114.

As was noted above the MAPP = 1 signal is also applied to the peripheral device 112. This signal is used to indicate to the peripheral device 112 that the requested memory access operation is being permitted. As a result, the peripheral device 112 generates the signal JOB = 0 until such time as it requires access again to a memory M (FIG. 1). Consequently, no additional request signals, REQA = 1, are generated.

In the above it was assumed that subsequent to the setting of the flip-flop ENP2 (FIG. 3), the signal MAPA = 1 was received from the MAC 1 (FIG. 1). If, however, the MAC, for reasons to be discussed subsequently, does not generate the signal MAPA = 1, the output of the AND gate 105 remains equal to 0. Consequently, the flip-flop MAPP is not set. Moreover, the AND gate 106 generates not only a first and a second REQA = 1 signal coincident with the first and second occurrence of the timing signal 1T3 (FIG. 4) following the generation of the signal JOB = 1, it also generates a third REQA = 1 with the next occurrence of the signal 1T3 = 1. If, as just assumed, the MAC 1 (FIG. 1) does not generate the signal MAPA = 1 in response to the first REQA = 1 signal, it may generate the signal MAPA = 1 in response to the second REQA = 1 signal. If that be the case, the flip-flop MAPP (FIG. 3) becomes set and no REQA = 1 signals are generated following the third such signal. In general, a request signal is generated in the 1T3 = 1 (FIG. 4) period of each controller cycle following a controller cycle in which a memory access permit signal (MAPA) is not received.

Thus, from the above discussion, it should be observed that the peripheral unit A generates a REQA = 1 signal requesting use of the PU bus at every opportunity until it is permitted to finish its requested job. More specifically, a REQA = 1, request for PU bus use signal, is sent by the peripheral unit A on a private line to the MAC 1 (FIG. 1) once each controller cycle without waiting for a determination of the result of the preceding REQA = 1 signal. Therefore, as will be seen below, the MAC 1 is provided with the ability to ignore a peripheral bus use request signal from a peripheral unit which has already been allowed memory access in response to its immediately preceding request.

Memory Access Controller

Having above discussed the operation of the typical peripheral unit A, attention is now turned to the detailed discussion of the operation of the MAC (FIG. 2). It will be recalled that each peripheral unit generates a request signal when it requires access to a memory. The request signals REQA, REQB, and REQC from the peripheral units A, B, and C, respectively, are applied to the AND gates 40 (FIG. 2B). For purposes of illustration it is assumed that the request signals REQA (FIG. 1) and REQB are both equal to 1 and the request signal REQC is equal to 0, indicating that the peripheral units A and B require a memory access and the peripheral unit C does not. When the timing signal 1T6 = 1 (FIG. 4) occurs, the gates 40 (FIG. 2B) are enabled to apply the request signals above described to the request register 39. The request register 39 contains one register stage or cell for each peripheral unit. In this case, for the assumed illustrative embodiment, the request register 39 contains three stages. The signals appearing at the output of the AND gates 40 thus determine the state of the three stages, respectively.

The three outputs of the request register 39 are applied to the OR gate 41 (FIG. 2D), the priority circuit 46, and the priority-1 circuit 58. Since two of the outputs of the request register 39 (FIG. 2B) are equal to 1 the output of the OR gate 41 (FIG. 2D) is equal to 1 but only one of the outputs of the priority circuit 46 is equal to 1. More specifically, priority circuit 46 generates, on one of its three outputs, a 1 signal corresponding to the highest priority peripheral unit having a 1 request signal stored in the request register 39 (FIG. 2B). In fact, the cells or stages of the register 39 are arranged in an ordered priority depending upon the connections made to the circuits 46 and 58 (FIG. 2D). In this case the priority circuit 46 generates a 1 signal which is applied to the one input of the equivalence gate 48a in the comparator 47 since the peripheral unit A has stored the request signal REQA = 1 in the highest priority stage of the request register 39 (FIG. 2B). Consequently, the other outputs of the priority circuit 46 (FIG. 2D) are both equal to 0. These outputs are applied, respectively, to the equivalence gate 48b and the equivalence gate 48c of the comparator 47.

As mentioned above, the outputs of the request register 39 (FIG. 2B) are also applied to the priority-1 circuit 58. Specifically, the outputs of the register 39 are applied, respectively, to the AND gates 57a, 57b, and 57c (FIG. 2D). It is the function of the priority-1 circuit 58 to generate on one of its three outputs a 1 signal corresponding to the peripheral unit which has stored a 1 request signal in the highest priority stage of the request register 39 (FIG. 2B) excluding the stage associated with the peripheral unit enabled as a result of the preceding set of service requests. It is here assumed that, for purposes of illustration, no peripheral unit was enabled during the preceding request sequence. Therefore, as will become clear in the subsequent discussion, the access permit register 64 (FIG. 2D) is cleared and all of its outputs, which are, respectively, applied to the inverters 66a, 66b, and 66c, are equal to 0. As a result, the outputs of the inverters 66 are all equal to 1. It can be seen in FIG. 2B that these outputs are applied, respectively, to inputs of the AND gates 57a, 57b, and 57c (FIG. 2D). Since both of the inputs of the AND gate 57a are, thus, equal to 1, the output of the AND gate 57a is equal to 1 and the output of the inverter 59 to which the output of the AND gate 57a is applied is equal to 0. Consequently, the outputs of AND gates 57b and 57c are both equal to 0 in response to the 0 signal from the inverter 59. Thus, only the output of the priority-1 circuit 58 corresponding to the output of the AND gate 57a is equal to 1.

The outputs of the priority-1 circuit 58 are applied to the inputs of the OR gate 50, the comparator 47, the AND gates 56, and the AND gates 61. Since one of the outputs of the priority-1 circuit 58 is equal to 1, the output of the OR gate 50 is equal to 1. In addition, since both of the inputs to the equivalence gate 48a are equal to 1, the output of that gate which is applied to an input of the AND gate 49 in the comparator 47 is also equal to 1. In addition, since both of the inputs of each of the equivalence gates 48b and 48c are equal to 0, the outputs of those two gates, which are, respectively, applied to the other two inputs of the AND gate 49 in the comparator 47 are also equal to 1. As a result, the output of the AND gate 49 and, thus, the comparator 47 is equal to 1.

From the above discussion it should be observed that the priority circuit 46 generates a 1 signal corresponding to the peripheral unit of highest priority which has stored a 1 request signal in the register 39 (FIG. 2B). The priority-1 circuit 58 (FIG. 2D) generates a 1 signal output corresponding to the highest priority peripheral unit which has stored a 1 request signal in the request register 39, excluding the peripheral unit previously enabled during the preceding request sequence. The outputs of the two circuits are, respectively, compared in the comparator 47 and a 1 signal is generated by the comparator 47 only if the signals generated by the two priority circuits 46 and 58 are precisely the same. A 1 signal from the comparator 47 indicates that the current highest priority peripheral unit requesting service is higher in priority than the last enabled peripheral unit whose identity is specified by the contents of the access permit register 64.

It can be seen in FIG. 2D that the output of the comparator 47 is applied to one input of the OR gate 52. As a result, the output of the OR gate 52 which is applied to an input of the AND gate 53 is equal to 1. The other input of the AND gate 53 is the output of the OR gate 41 which is also equal to 1 in response to the contents of the request register 39. Therefore, the output of the AND gate 53, which is the signal EN, is equal to 1. This signal is used to indicate that an enable signal should be dispensed to the appropriate peripheral unit. Thus, when the timing signal 7T9 (FIG. 4) becomes equal to 1 the AND gate 54 (FIG. 2D) to which both the timing signal 7T9 (FIG. 4) and the signal EN are applied becomes equal to 1. The output of the AND gate 54 (FIG. 2D) is applied to the S input of the flip-flop EN1 and to one of the inputs of the AND gates 56, respectively. As a result, flip-flop EN1 is set and a 1 signal is applied to one of the inputs of each of the AND gates 56. It will be recalled that a 1 signal is generated by the priority-1 circuit 58 and applied to the other input of the AND gate 56a. In addition, 0 signals are generated by the priority-1 circuit 58 and applied, respectively, to the inputs of the AND gates 56b and 56c. Consequently, a 1 signal is generated at the output of the AND gate 56a and 0 signals are generated at the outputs of the AND gates 56b and 56c. It should be observed that the outputs of the AND gates 56a, 56b, and 56c correspond to the enable signals ENA, ENB, and END (FIG. 1). Thus, as a result of the request signals REQA, REQB, and REQC received as above described and in view of the assumed cleared condition of the access permit register 64 (FIG. 2D), the signals ENA = 1 (FIG. 1), ENB = 0, and ENC = 0 are generated in the time interval during which 7T9 = 1 (FIG. 4). These signals are applied to the peripheral units A, B, and C (FIG. 1), respectively. It should be apparent from the previous discussion that in response to these signals, the peripheral unit A is enabled and the peripheral units B and C are not enabled.

It should be noted here that all of the operations just described occur during what will be referred to as controller cycle C1 (FIG. 4) of a request sequence. This controller cycle designation merely serves to provide a reference for observing the timing of events in the controller. The controller cycle C1 should not be taken as literally being the first controller cycle; other controller cycles may precede controller cycle C1 (FIG. 4). More specifically, the generation of request signals occurs during the interval in which 1T3 is equal to 1 in the controller cycle C1. These signals propagate to the MAC (FIG. 2) and are received by the MAC in the interval in which the signal 1T6 (FIG. 4) is equal to 1 during the controller cycle C1. These signals are processed by the MAC (FIG. 2) and enable signals are generated by the MAC in the interval in which 7T9 (FIG. 4) is equal to 1 during controller cycle C1. The enable signals propagate to the appropriate peripheral units and are received in the interval in which 7T12 is equal to 1 during the controller cycle C1.

In response to the enable signal, ENA = 1 (FIG. 1) in the assumed example, the peripheral unit A (FIG. 3) gates address data, as above described, to the PU address bus in the interval when 13T1 (FIG. 4) is equal to 1 during the transition from controller cycle C1 to controller cycle C2. For a memory write operation, the peripheral unit A (FIG. 3) also gates write data to the PU reply bus in the interval when 6T8 (FIG. 4) is equal to 1 during the controller cycle C2. The address data are received by the MAC (FIG. 2) in the interval when 13T4 (FIG. 4) is equal to 1 during the transition from controller cycle C1 to controller cycle C2 and are gated into the address buffer register 69 (FIG. 2C). The write data are received by the MAC (FIG. 2) in the interval when 6T11 (FIG. 4) is equal to 1 during the controller cycle C2 and are gated into the reply register 153 (FIG. 2B). Whether or not this address and write data are transmitted to the appropriate memory depends on whether there is a conflict with the memory bus needs of the CPU (FIG. 1). Attention is, therefore, turned to the determination of such conflicts and their resolution.

When the CPU 2 (FIG. 1) requires access to one of the memories M, it generates the signal CPU ACCESS = 1. This signal is applied to one input of the AND gate 81 (FIG. 2C). The other input of that AND gate is the signal $\overline{\text{STOP-CPU}}$ which, for illustrative purposes, will be assumed here to be equal to 1. As a result, the AND gate 81 generates a 1 signal and enables the AND gates 26. The outputs of the AND gates 26, thus, reflect the signals appearing at their respective inputs from the CPU address bus. In particular, the output of the AND gate 26a, reflecting the most significant bit in the address, indicates which of the memory buses, B0 or B1, is required for the CPU access. If the output of the AND gate 26a is equal to 1, the memory bus B1 is required; otherwise, the memory bus BO is required. The output signal of AND gate 26a is applied to AND gates 31 to gate the remaining portions of the address to the B1 address bus when that bus is required for CPU memory accessing. It is also applied to the AND gates 80a and 85a as will be described below. The output signal of AND gate 26a is also inverted in inverter 94 and applied to AND gates 80b and 85b and to AND gates 32 to gate address data when appropriate to the BO address bus.

The respective other inputs of the AND gates 80a and 80b are driven by the CPU ACCESS signal. The resulting output signals CPU-B1 and CPU-BO, respectively, are individually equal to 1 when CPU 2 (FIG. 1) requires access via the B1 bus or the BO bus, respectively. These signals are each inverted in the inverters 75a and 75b (FIG. 2C) and applied, respectively, to the AND gates 77a and 77b. Here these two signals are individually combined with signals indicating the memory bus required for the accessing operation associated with the address data stored for the enabled peripheral unit A (FIG. 3) in the address buffer register 69 (FIG. 2C). Specifically, the signal PU-B1 reflects the most significant bit of the address stored in the register 69 and thus indicates the memory bus required. This signal and its inverted version PU-BO from the inverter 86 gate the stored address data to the B1 address bus through the AND gates 29 or the BO address bus through the AND gates 30, as appropriate. In addition, as mentioned above, these signals are logically combined, respectively, in the AND gates 77a and 77b with signals $\overline{\text{CPU-B1}}$ and $\overline{\text{CPU-BO}}$ from the inverters 75a and 75b. If either of these AND gates generates a 1 signal, there is no conflict between the bus needs of the CPU 2 (FIG. 1) and the peripheral unit A. If neither generates a 1 signal, there is a conflict Assuming there is no conflict and one of the AND gates 77a (FIG. 2C) or 77b generates a 1 signal, the OR gate 79 generates a 1 signal which is applied to an input of the AND gate 84. One of the other inputs of the AND gate 84 is driven by the signal EN2 (FIG. 2D). This signal is the Q output of the flip-flop EN2 which is driven by the signal EN1 through the AND gate 55. As was seen above, the flip-flop EN1 was set during the controller cycle C1, reflecting the transmission of an enable signal to a peripheral unit. Consequently, with the occurrence of the signal 3T5 = 1 (FIG. 4) in the controller cycle C2, the flip-flop EN2 (FIG. 2D) is also set. Therefore, the signal EN2 = 1 is applied to the AND gate 84 (FIG. 2C).

The final input of the AND gate 84 is driven by the inverter 76. The signal appearing at the output of the inverter 76 will be discussed in more detail below. Suffice it here to say, the output signal of inverter 76 prevents the use of a memory bus if the particular bus is still busy from a prior accessing operation. Assuming that such is not the case here, the signal applied by the inverter 76 to the final input of the AND gate 84 is equal to 1. Consequently, the AND gate 84 generates a 1 signal which is applied to the S input of the flip-flop GO-PU, setting that flip-flop.

With the setting of the flip-flop GO-PU, the signal GO-PU = 1 is generated. This signal is applied to the AND gates 65 (FIG. 2D) partially enabling those AND gates to generate the aforementioned memory access permit signals. More specifically, for the assumed example, subsequent to the generation of the enable signal ENA = 1 (FIG. 1), the signals EN = 1 (FIG. 2D) and 11T13 = 1 (FIG. 4) in the controller cycle C1 enable the AND gates 61 (FIG. 2D) to gate the signals appearing at the outputs of the priority-1 circuit 58 into the enable buffer 62. The output signals generated and stored in the enable buffer 62 for the AND gates 61 are, respectively, 1 for AND gate 61a, 0 for AND gate 61b, and 0 for AND gate 61c. Subsequently, when the timing signal 2T4 (FIG. 4) becomes equal to 1 in the controller cycle C2, the data stored in the enable buffer 62 (FIG. 2D) are transferred through the AND gates 63 to the access permit register 64. Consequently, the signals applied by the access permit register 64 to the AND gates 65 are, respectively, 1 for the AND gate 65a, 0 for the AND gate 65b, and 0 for the AND gate 65c. With these signals applied to the AND gates 65, the occurrence of the timing signal 7T9 = 1 (FIG. 4) in the controller cycle C2 concurrently with the signal GO-PU = 1 (FIG. 2C) results in the generation of the signal MAPA = 1 and the signals MAPB = MAPC = 0. It will be recalled that the generation of the signal MAPA = 1 and its reception by the peripheral unit A (FIG. 3) indicates to that peripheral unit that its requested memory access is permitted.

The signal GO-PU = 1 (FIG. 2C) also enables the AND gates 28 to supply the address data stored in the address buffer register 69 to the AND gates 29 and 30. As a result, when the timing signal 5T7 (FIG. 4) becomes equal to 1 in controller cycle C2, the address data are gated to the appropriate B0 or B1 bus (FIG. 2A) by the AND gates 29 or 30 (FIG. 2C).

In addition, the signal GO-PU = 1 is applied to the AND gate 78a (FIG. 2A) and through it, when timing signal 12T0 (FIG. 4) equals 1, to the S input of the flip-flop GO-PU1 (FIG. 2C). As a result, the flip-flop GO-PU1 becomes set and a 1 signal is applied to an input of the AND gate 78b. Thereafter, when timing signal 6T8 (FIG. 4) equals 1 in controller cycle C3 a 1 signal is generated by the AND gate 78b (FIG. 2C) and applied to the S input of the flip-flop GO-PU2. Consequently, the flip-flop GO-PU2 becomes set. It should be recognized that the flip-flops GO-PU1 and GO-PU2 merely provide delay for the signal GO-PU = 1.

The signal GO-PU1 = 1 is also applied to an input of the AND gate 92 (FIG. 2B). The other input of that AND gate is the signal RDP which is equal to 1 if the data stored in the address buffer register 69 (FIG. 2C) specify a write memory operation. More specifically, if the particular bit of the data stored in the address buffer register 69 driving the AND gate 28b is equal to 0, data are stored in the reply register 153 (FIG. 2B) from the peripheral unit A (FIG. 3) for storage in the appropriate memory M (FIG. 1). If that is the case, the signal RDP at the output of the inverter 83 (FIG. 2C) is equal to 1 coincident with the signal GO-PU1 = 1 from the GO-PU1 flip-flop. Thus, the AND gates 34 (FIG. 2B) are enabled by the 1 signal generated by the AND gate 92 and they apply the data stored in the reply register 153 to the AND gates 37 and 38. The AND gates 37 are also driven by the signal PU-BO1. That is the signal at the Q output of the flip-flop PU-BO1 which is a delayed version of the previously discussed signal PU-BO. Similarly, the AND gates 38 are all driven by the signal $\overline{\text{PU-BO1}}$. Thus, depending upon the memory bus specified by the peripheral unit in its addressing data, the data supplied by the peripheral unit are gated by the appropriate AND gates 37 or 38 to the BO or the B1 write bus when the timing signal 13T1 (FIG. 4)

becomes equal to 1 during the transition from controller cycle C2 to the controller cycle C3.

If the operation specified by the data stored in the address buffer register 69 (FIG. 2C) is a read from memory operation rather than a write to memory operation, a 1 signal appears at the particular output of the address buffer register 69 which drives the AND gate 28b. This 1 signal is applied to the AND gate 82a and sets the flip-flop RW1 when the timing signal 9T11 becomes equal to 1 in the controller cycle C2. Subsequently, the 1 signal at the Q output of the RW1 flip-flop is applied to an input of the AND gate 82b and, as a result, the flip-flop RW2 is set by the 1 signal from AND gate 82b when the signal 4T6 becomes equal to 1 in the controller cycle C3 (FIG. 4). Thus, both input signals to the AND gate 73 (FIG. 2A), the GO-PU2 signal at the Q output of the previously mentioned GO-PU2 flip-flop, and the RW2 signal at the Q output of the flip-flop RW2, are equal to 1 during the controller cycle C3. Consequently, data applied to the AND gates 24 are gated by the 1 signal from AND gate 73 into the write register 68 and subsequently to the PU write bus by the AND gates 25 when the signal 13T1 becomes equal to 1 during the transition from controller cycle C3 to C4 (FIG. 4).

The particular data signals that are gated by the AND gates 24 (FIG. 2A) to the register 68 are determined by which of the sets of AND gates 22 or 23 are enabled by the outputs of the flip-flop PU-BO2. The outputs of that flip-flop are delayed versions of the outputs of the flip-flop PU-BO1. Consequently, when data are received from either the BO or the B1 reply bus, the appropriate data are gated into the write register 68 and to the PU write bus.

The above has described the operation of the memory access controller (FIG. 2) when an enabled peripheral unit, specifically peripheral unit A (FIG. 1), is permitted to complete its required memory access operation. More specifically, the above described operation is that of the memory access controller (FIG. 2) in the absence of a conflict between the bus requirement of the enabled peripheral unit and that of the CPU 2 (FIG. 1). If, however, a conflict does exist, the operation of the MAC is substantially changed.

More specifically, if after having enabled the peripheral unit A during controller cycle C1 (FIG. 4), a conflict arises between the CPU bus requirement and that of the enabled peripheral unit, the flip-flop GO-PU (FIG. 2C) is not set as it was in the prior discussion. Moreover, with the occurrence of the signal 7T9 = 1 (FIG. 4) in the controller cycle C2, the AND gate 72 (FIG. 2A) to which the signal EN2 = 1, previously discussed, is applied, generates a 1 signal which is applied to the toggle ($t$) input of the flip-flop C1 in the counter 67. As a result, the counter 67 raises its count to 1. The significance of this counter lies in the fact that when the counter reaches the count of 3, the flip-flop STOP CPU becomes set and signals are transmitted to the CPU 2 (FIG. 1) to halt the operation of the CPU 2. These signals are in the nature of interrupts to permit a peripheral unit to access its required memory bus. They serve to prevent monopolization of a particular memory bus by the central processing unit to the exclusion of all peripheral units.

In addition to the counter 67 (FIG. 2A) assuming the count of 1, the request register 39 (FIG. 2B) also receives a second set of request signals in controller cycle C2 (FIG. 4). It should be recalled that the peripheral unit A (FIG. 3) produces a second request signal in the controller cycle C2 and transmits it to the MAC (FIG. 2) even though it has not yet been apprised of the results of its initial request signal. The other peripheral units B and C (FIG. 1) also repeat their respective request signals, as well. Consequently, a REQA = 1 signal along with the signals REQB = 1 and REQC = 0 are received in the controller cycle C2 and stored in the request register 39 (FIG. 2D).

Since the peripheral unit A is the highest priority peripheral unit, priority circuit 46 generates a 1 signal on its output driving equivalence gate 48a and 0 signals on its other outputs. Priority-1 circuit 58, however, generates a 1 signal on its output which drives the equivalence gate 48b and 0 signals on its other outputs. This is due to the fact that the access permit register 64 contains the priorly stored signals reflecting the enable signal previously sent to the peripheral unit A in the controller cycle C1. Thus, the comparator 47 has inputs on its equivalence gates 48a and 48b which are not, in fact, equivalent and, as a result, it does not generate a 1 signal at its output. Moreover, since the signal GO-PU is equal to 0 in view of the conflict, the AND gate 51, to which the signal GO-PU = 0 is applied, generates a 0 signal at its output. Consequently, the output of the OR gate 52 is equal to 0, as is the output of the AND gate 53 which is driven by the OR gate 52. As a result, the signal EN = 0 is generated by the AND gate 53 which prevents the setting of the flip-flop EN1 and also prevents the generation of any additional enable signals. Moreover, the EN = 0 signal does not enable the clearing of the access permit register 64; and, further, since the flip-flops EN1 and EN2 are not set, the address buffer register 69 (FIG. 2C) and the reply register 153 (FIG. 2B) are not cleared by 1 signals from AND gates 74 (FIG. 2C) and 91 (FIG. 2B), respectively. Consequently, the address data and the write data stored in the respective registers are preserved for later use.

Since it was assumed above that there is a conflict in the controller cycle C2 between the CPU 2 (FIG. 1) bus requirements and the peripheral unit A bus requirements, it is important to note that the CPU ACCESS = 1 signal and the CPU address information on the CPU address bus are only present throughout the controller cycle C2 (FIG. 4). However, the assumed memory cycle length is twice that of a controller cycle. Thus, any use of the memory bus by the CPU 2 (FIG. 1) or a peripheral unit requires two controller cycles. Consequently, since there is a conflict, as observed above, for controller cycle C2, there must also be a conflict for controller cycle C3 unless the bus required for peripheral unit use changes. To determine the existence of such a continuing conflict for the controller cycle C3, it is necessary to have stored data indicating which of the memory buses was used in controller cycle C2.

As was mentioned earlier, the signal at the output of the AND gate 26a, indicating the memory bus required by the CPU 2 (FIG. 1), is applied to an input of the AND gate 85a. The logical complement of that signal is applied to an input of the AND gate 85b. Moreover both of the AND gates 85a and 85b are driven by the CPU ACCESS signal and the timing signal 11T13. Thus, when the CPU ACCESS signal equals 1 simultaneously with the signal 11T13 = 1 in the controller cycle C2, the signals at the outputs of the AND gate 26a and the inverter 94 are gated to the S inputs of the flip-flop CPU-B11 and CPU-B01, respectively. As a result, if the CPU 2 (FIG. 1) requires the memory bus B1, the flip-flop CPU-B11 becomes set; otherwise the flip-flop CPU-B01 becomes set. When the signal 6T8 becomes equal to 1 in the controller cycle C3, the signals at the Q outputs of these two flip-flops are gated through the AND gates 91a and 91b, respectively, to the S inputs of the flip-flops CPU-B12 and CPU-B02. As a result these flip-flops become set in correspondence to the applied signals. The signals CPU-B12 and CPU-B02 appearing respectively at the Q outputs of the aforementioned flip-flops are used in gating data on the B1 relay bus through the AND gates 21 or data on the B0 reply bus through the AND gates 20 to the CPU reply bus when the timing signal 7T13 becomes equal to 1 in the controller cycle C3.

The signals CPU-B11 and CPU-B01 are also applied respectively to inputs of the AND gates 87a and 87b. The respective other inputs of these gates are driven by the signal PU-B1 and PU-B0. Thus, for example, if during the controller cycle C2 the CPU 2 (FIG. 1) begins the use of the bus B1, the signal CPU-B11 = 1 is applied during the controller cycle C3 to the aforementioned input of AND gate 87a. If, also during the controller cycle C3 (FIG. 4) the currently enabled peripheral unit requires the use of bus B1, the signal PU-B1 = 1 is applied to the other input of the AND gate 87a and a 1 signal is generated at the output of AND gate 87a. This 1 signal indicates that there is a conflict because the bus B1 is still busy with the CPU access begun earlier and yet it is needed by the currently enabled peripheral unit. The 1 signal from gate 87a produces a 1 signal at the output of the OR gate 88. Consequently, the output of the inverter 76 is equal to 0. This, in turn, prevents the flip-flop GO-PU from being set with the results previously described.

The AND gates 87c and 87d perform a function similar to that of gates 87a and 87b except with respect to conflicts arising when a peripheral unit has begun to use a memory bus during the first half of a memory cycle. For example, if during the controller cycle C2, the then currently enable peripheral unit begins to use the bus B1, the signal PU-B01 = 1 is applied during the controller cycle C3 to an input of AND gate 87c together with the delayed GO-PU signal, GO-PU1 = 1. If, also during controller cycle C3, the peripheral unit enabled subsequent to the peripheral unit which is currently accessing memory, requires access by means of bus B1, the signal PU-B1 = 1 is applied to the other input of gate 87c. As a result, the gate 87c generates a 1 signal which, in turn, produces a 1 signal at the output of OR gate 88 and a 0 signal at the output of inverter 76. Consequently, the GO-PU flip-flop is not set and the latter enabled peripheral unit is not permitted to employ the bus B1 during controller cycle C3.

In addition, whenever a memory bus is busy with an accessing operation begun by a peripheral unit in the preceding controller cycle, a 1 signal is generated, as appropriate, by one of the AND gates 89a and 89b to indicate the particular busy memory bus. This 1 signal is applied to an input of the OR gates 90a and 90b. As a result, a STOP CPU BUS 1 signal or a STOP CPU BUS O signal, as appropriate, is sent to the CPU 2 (FIG. 1) to indicate that the particular bus is unavailable for CPU accessing.

What is claimed is:

1. In a memory access controller for use in a data processing system having a plurality of memories, a processor, and a plurality of peripheral units competing with said processor for access to said memories, said memory access controller having means for repetitively receiving sets of memory access requests from said units, the improvement comprising:
 a first priority circuit responsive to the receipt of a set of access requests from said units for producing an output identifying a first one of said units having the highest priority request in said request set;
 a second priority circuit responsive to the receipt of said request set for producing an output identifying a second one of said units having the highest priority requests in said request set;
 means responsive to the outputs produced by said first priority circuit and said second priority circuit for comparing said outputs to determine if said first priority circuit and said second priority circuit identify the same one of said units;
 means cooperating with said comparing means for storing the output of said second priority circuit when said first and said second priority circuits identify the same one of said units;
 means controlled by said storing means for blocking subsequent access requests generated by the unit identified by an output stored in said storing means from reaching said second priority circuit; and
 means cooperating with said comparing means for enabling the unit identified by said second priority circuit to generate an address code if said first and second priority circuits identify the same one of said units.

2. In a memory access controller according to claim 1 further having means for receiving an address code from said units designating a particular one of said memories, means for receiving an address code from said processor, and means for processing said processor address code and said peripheral unit address codes to detect a conflict between a processor access request and peripheral unit access requests, the improvement further comprising:
 means cooperating with said processing means and said storing means for preventing further access requests from being generated by the unit identified by an output stored in said storing means in the absence of a conflict between memory access requests by said processor and said enabled peripheral unit;
 means cooperating with said processing means for controlling said enabling means to enable address code generation in the unit identified by the output of said second priority circuit in the absence of a conflict between memory access requests by said central processor and said enabled peripheral unit; and
 means cooperating with said processing means for controlling said storing means to store the output of said second priority circuit in the absence of a conflict between memory requests by said processor and said enabled peripheral unit.

3. In a memory access controller according to claim 2 wherein said storing means comprises a first storage stage, a second storage stage, means for loading the output of said second priority circuit into said first stage and means for transferring information stored in said first stage to said second stage at a predetermined time, the improvement further comprising means cooperating with said comparing means for clearing said second stage of said storing means when said first and second priority circuits identify the same one of said units, and means for cooperating with said processing means for clearing the second stage of said storing means in the absence of a conflict between memory access requests by said central processor and said enabled peripheral unit.

* * * * *